E. OLSON.
GRAIN SHOCKER.
APPLICATION FILED JULY 28, 1908.

997,083.

Patented July 4, 1911.
6 SHEETS—SHEET 1.

Witnesses
Frank B. Hoffman
Horace H. Lybrand

Inventor
Edward Olson
By Victor J. Evans
Attorney

E. OLSON.
GRAIN SHOCKER.
APPLICATION FILED JULY 28, 1908.

997,083.

Patented July 4, 1911.
6 SHEETS—SHEET 2.

Witnesses
Frank B. Hofmau
Horace N. Lybrand

Inventor
Edward Olson
By Victor J. Evans
Attorney

E. OLSON.
GRAIN SHOCKER.
APPLICATION FILED JULY 28, 1908.

997,083.

Patented July 4, 1911.
6 SHEETS—SHEET 3.

Witnesses
Frank B. Hoffman
Horace H. Lybrand

Inventor
Edward Olson
By Victor J. Evans
Attorney

E. OLSON.
GRAIN SHOCKER.
APPLICATION FILED JULY 28, 1908.

997,083.

Patented July 4, 1911.
6 SHEETS—SHEET 4.

Witnesses
Frank B. Hoffman
Horace N. Lybrand

Inventor
Edward Olson
By Victor J. Evans
Attorney

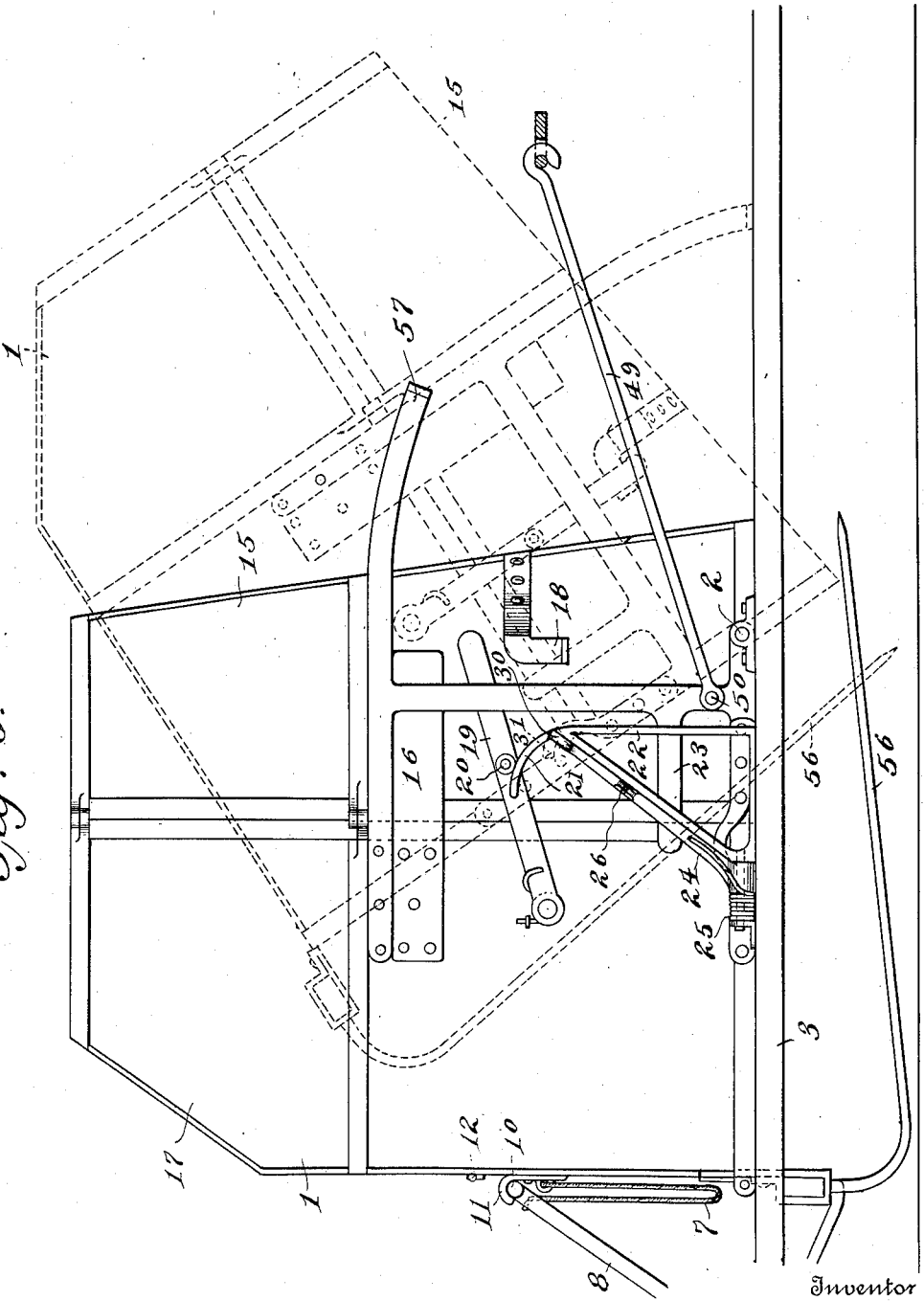

E. OLSON.
GRAIN SHOCKER.
APPLICATION FILED JULY 28, 1908.
997,083.
Patented July 4, 1911.
6 SHEETS—SHEET 6.
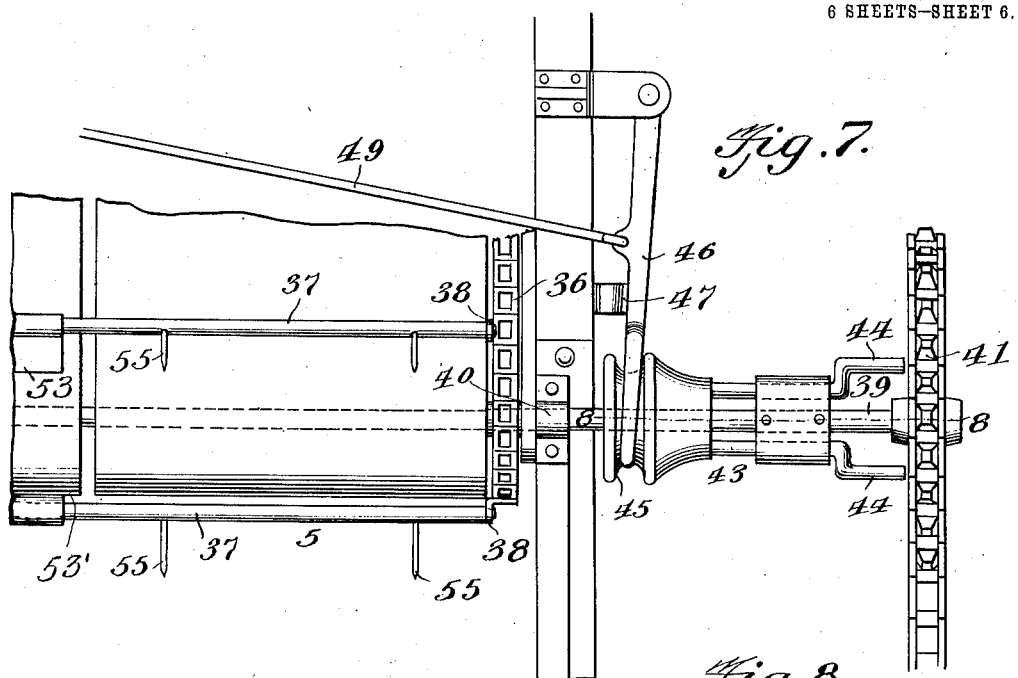
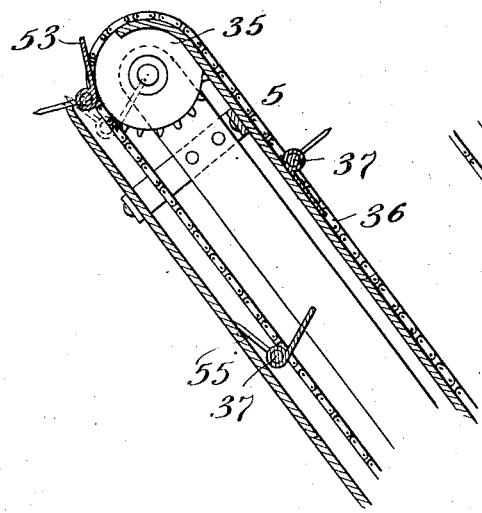
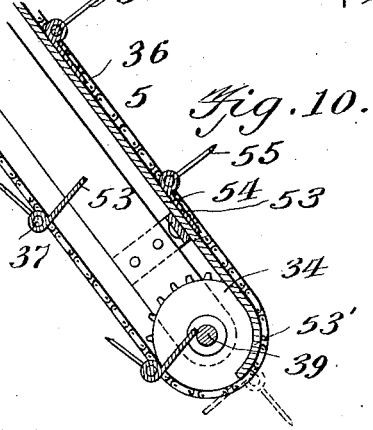
Witnesses
Frank B. Hofman
Horace H. Lybrand
Inventor
Edward Olson
By Victor J. Evans
Attorney

UNITED STATES PATENT OFFICE.

EDWARD OLSON, OF JASPER, MINNESOTA, ASSIGNOR OF ONE-EIGHTH TO J. D. SWALE-STUEN, ONE-EIGHTH TO O. O. HERHEIM, ONE-EIGHTH TO L. C. BENSON, AND ONE-EIGHTH TO H. HOLVIG, OF JASPER, MINNESOTA.

GRAIN-SHOCKER.

997,083.     Specification of Letters Patent.     Patented July 4, 1911.

Application filed July 28, 1908. Serial No. 445,765.

*To all whom it may concern:*

Be it known that I, EDWARD OLSON, a citizen of the United States, residing at Jasper, in the county of Pipestone and State of Minnesota, have invented new and useful Improvements in Grain-Shockers, of which the following is a specification.

This invention relates to shock formers, and has for an object to provide a pivotally mounted shock receptacle having its longitudinal axis normally in a forwardly and downwardly inclined position and movable from such normal position to a substantially vertical or discharging position, and to provide simple and efficient means for holding the receptacle in bundle receiving or bundle discharging positions.

A still further object of the invention is to provide a shock former designed for attachment to a binder so as to be moved therewith on its travel through a field and to provide an improved carrier receiving the bundles from the binder and conveying them to the forming receptacle.

Figure 1:
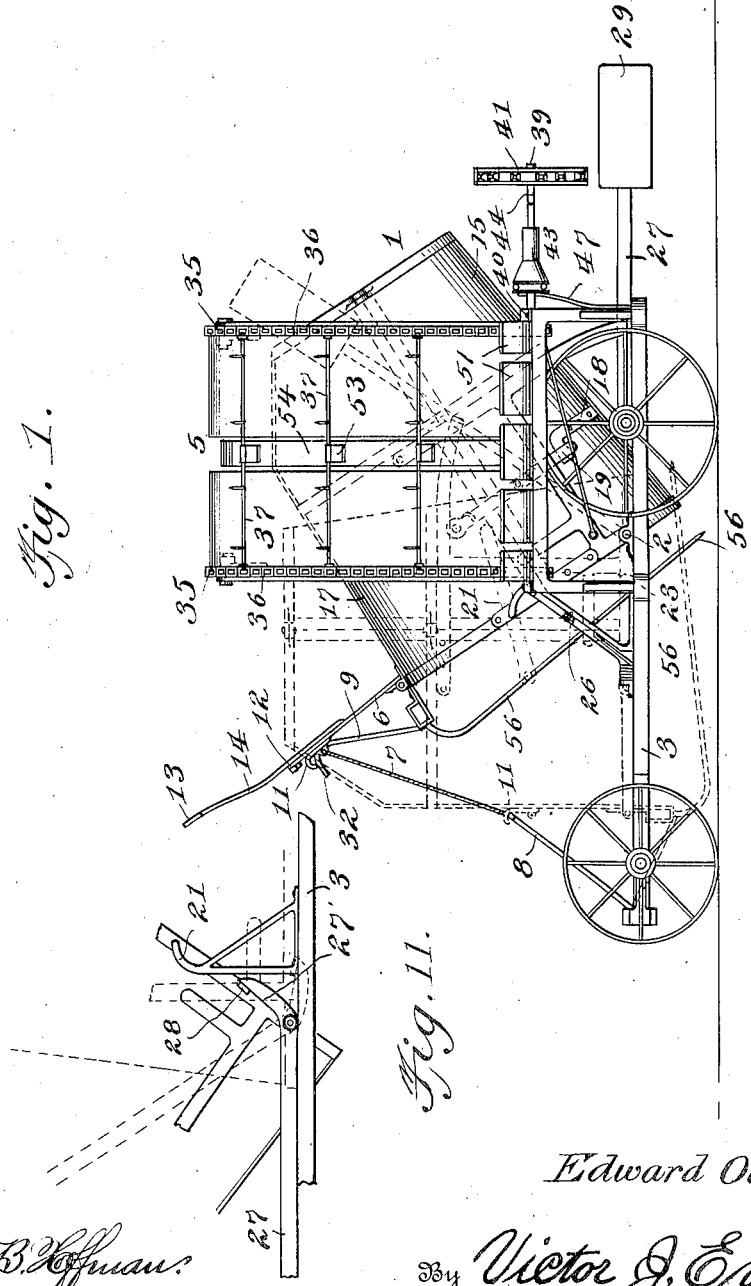
Figure 2:
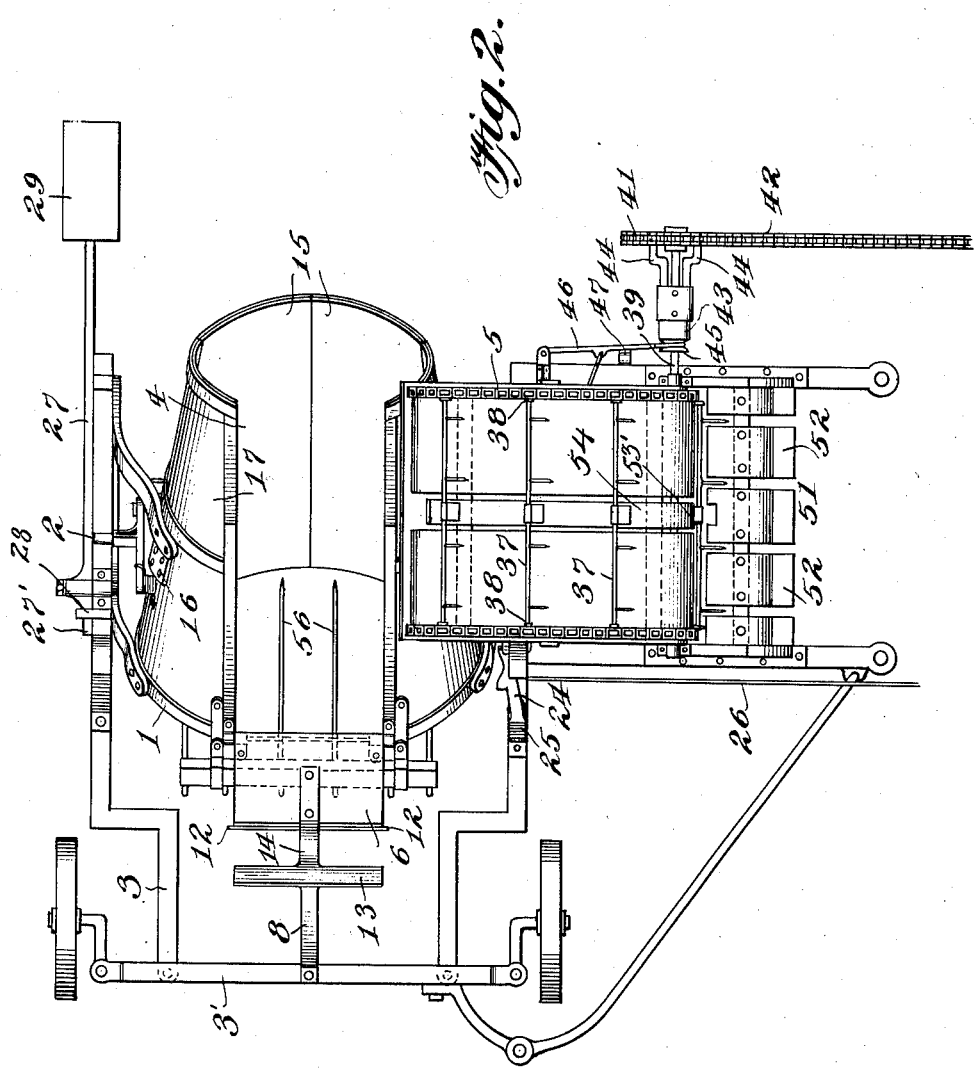
Figure 3:
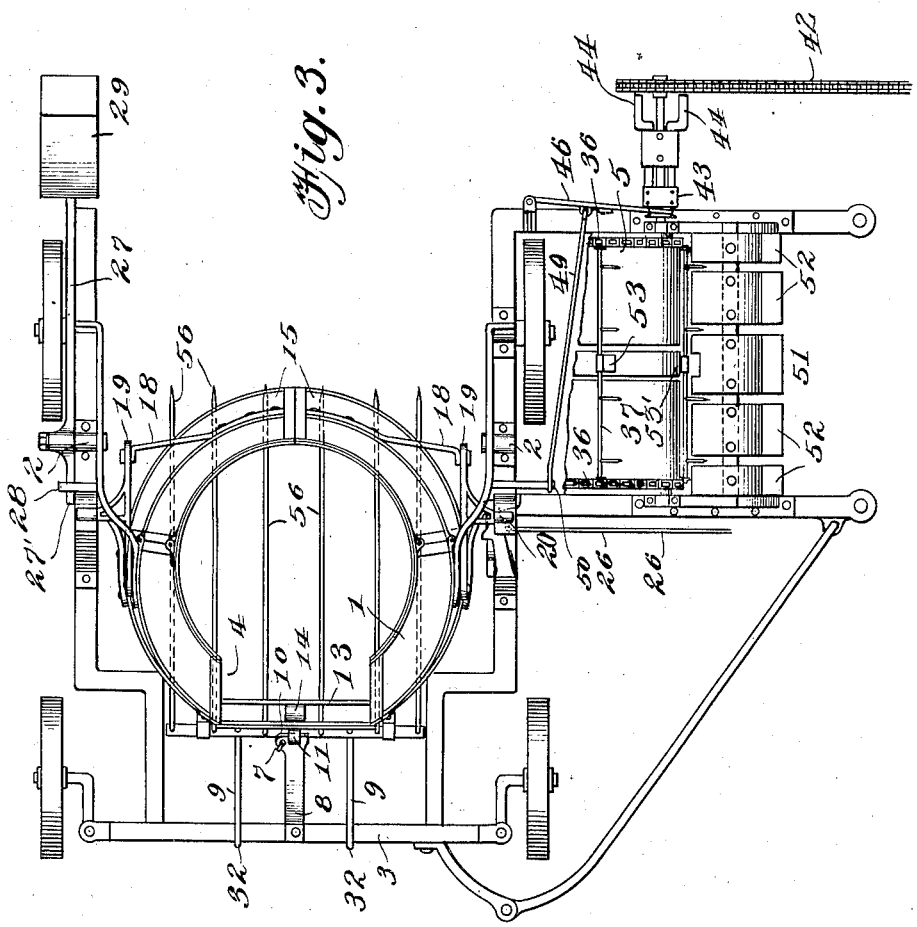
Figure 4:
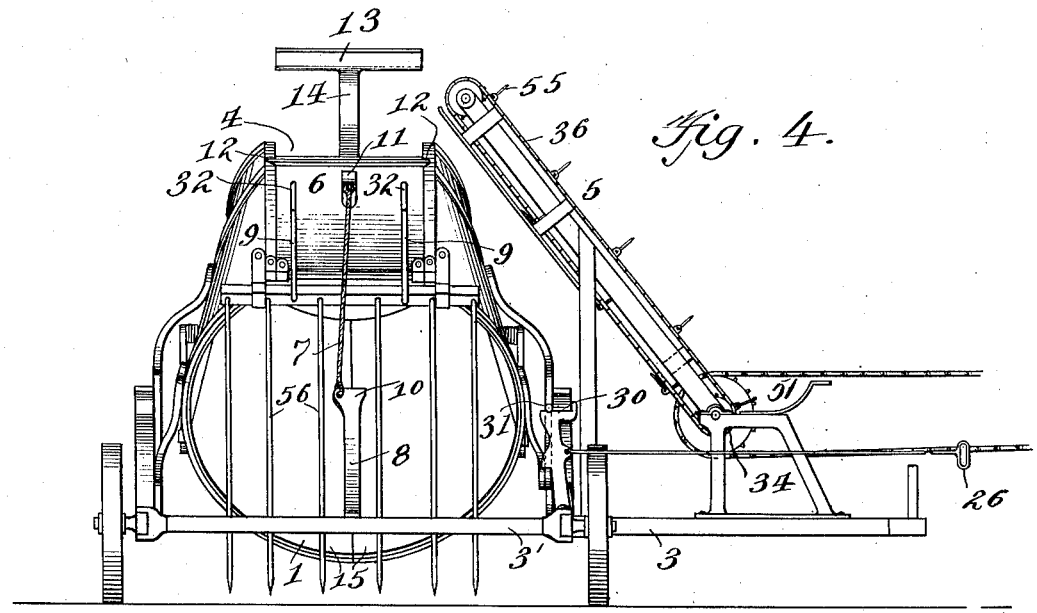
Figure 5:
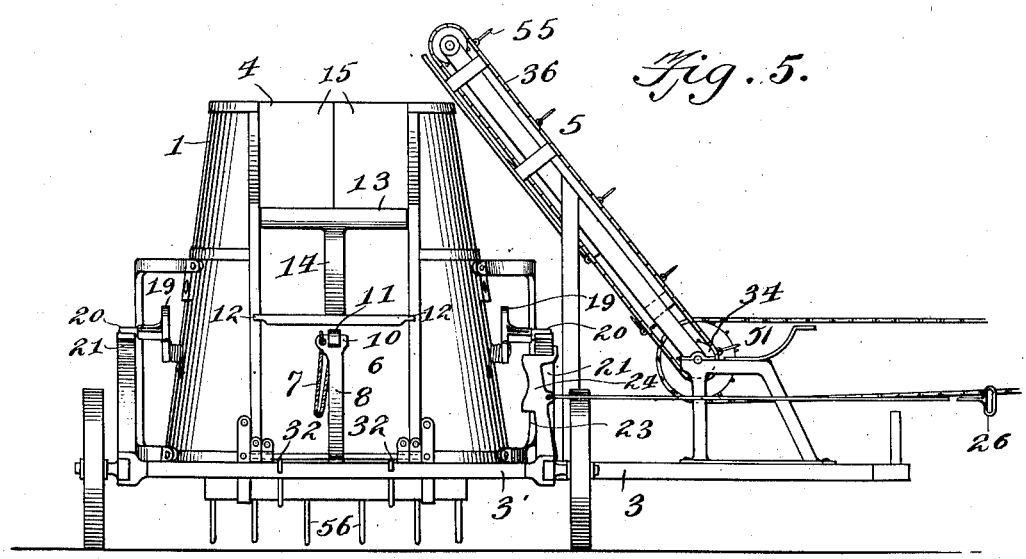

In the drawings, forming a portion of this specification and in which like numerals of reference indicate similar parts in the several views:—Figure 1 is a side elevation of my improved shock former showing the receptacle in bundle receiving position in full lines and in bundle discharge position in dotted lines. Fig. 2 is a top plan view of the former showing the receptacle in bundle receiving position. Fig. 3 is a top plan view showing the receptacle in bundle discharging position. Fig. 4 is a front elevation showing the receptacle in bundle receiving position. Fig. 5 is a similar view showing the receptacle in bundle discharging position. Fig. 6 is a side view of the receptacle in discharge position, the bundle carrier being removed for the purpose of clearness, the receptacle being shown in receiving position in dotted lines. Fig. 7 is a fragmentary view of a portion of the carrier illustrating the clutch mechanism. Fig. 8 is a detail section taken on the line 8—8 of Fig. 7. Fig. 9 is a detail section through the upper portion of the carrier. Fig. 10 is a detail section through the lower portion of the carrier. Fig. 11 is a side elevation of a portion of the receptacle showing the weight arm and its actuating portion operatively associated with the receptacle to move it to bundle discharging position.

The shock former herein illustrated is constructed with a view of permitting it to be attached to any well known form of grain binder, (not shown), and it preferably consists of a forming receptacle 1 which is pivotally mounted, as shown at 2, on a wheeled frame 3.

The receptacle 1 is provided at its front end with a bundle receiving opening 4 which is located slightly below the highest point of the bundle carrier 5 when the receptacle is in bundle receiving position. The receptacle is provided at its opening 4 with a swinging closure forming member 6, the said member having connected therewith one end of a cable 7 or the equivalent thereof, the opposite end of the same being connected with a stationary actuating element 8 at the forward end of the frame 3. The purpose of the connection 7 is to hold the member 6 in an open position when the forming receptacle is in bundle receiving position. Stops 9 are carried by the receptacle 1 and they are located preferably near the bottom of the bundle receiving opening. These stops are designed to engage the member 6 when the latter is in a position shown in Fig. 1 so as to limit the movement of such member in one direction. The actuating element 8 is provided at its upper end with a head 10 which is designed to be engaged by the hook 11 on the member 6 so as to limit the swinging movement of the receptacle and to hold it in a vertical position when discharging the bundles. The member 6 is provided with stops 12 to engage the sides of the receptacle adjacent to the bundle receiving opening 4 so as to limit the movement of the said member 6 in one direction. The member 6 supports a presser-head 13 which is located at the upper end of a leaf spring 14. On movement of the receptacle to its vertical position the member 6 will be engaged by the actuating element 8.

At the rear, the receptacle is provided with outwardly swinging discharge gates 15. These gates are normally held in their closed position by leaf springs 16 which are secured to the part 17 of the receptacle. To hold the gates positively locked when the receptacle is in bundle receiving position, I provide each gate with a keeper 18 which is engaged by a spring latch member 19 on the part 17 of the receptacle. The latch members 19 are provided with portions 20 to be obstructed by the surfaces 21 of the latch releasing members 22 on the frame 3 upon movement of the receptacle to its vertical position.

To hold the receptacle against movement when in bundle discharging or vertical position, I provide the receptacle with a keeper 23 which is designed to be engaged by a pivotally mounted latch member 24 on the frame 3. A spring 25 exerts its tension against the latch member 24 to hold it normally in engaged position. A controlling rod 26 is secured to the latch member and it is designed to be manipulated manually to move the latch member to its released position. To move the receptacle automatically to bundle receiving position on release of the latch member 24 from the keeper 23, I provide a weight arm 27. This arm 27 is pivoted to the frame 3 at one side thereof and at one end the arm is provided with an actuating finger 27' to engage the finger 28 on the receptacle. The opposite end of the arm 27 is provided with a suitable weight 29. To hold the receptacle in receiving position I provide the latch member 24 with a retaining portion 30 to engage the keeper 31 on the receptacle. When a sufficient number of bundles have been conveyed to the receptacle to form a shock, the latch member 24 is withdrawn and the receptacle is moved manually to its vertical or bundle discharging position, whereupon, the latch member is allowed to return under action of the spring 25 to lock the receptacle in this position. When the shock has been deposited the latch member is again withdrawn and the weight 29 restores the receptacle to its receiving position. The stops 9 are provided with hooked ends 32 to engage the front bar 3' of the frame 3 to stop the receptacle when it has reached its vertical or discharging position.

The carrier 5 may be of any well known construction which may be found most desirable for the purpose. As illustrated, the carrier comprises lower driving sprocket gear wheels 34 and upper driven sprocket gear wheels 35. The upper and lower gear wheels are connected by carrier chains 36. These chains are spaced apart, as shown, and they are connected with each other by horizontal rods 37. These rods are pivotally mounted in suitable bearing members 38 on the chains. The driving sprocket wheels 34 are supported by a shaft 39 which is mounted in suitable bearings 40 on the frame 3, and as illustrated, this shaft is provided at one end with a loose driving sprocket gear wheel 41 which is connected with a drive chain 42. The drive chain 42 can receive its power from any suitable source, (not shown). A sliding clutch 43 is mounted on the shaft 39. This clutch comprises spaced fingers 44 and a grooved collar 45. The collar 45 is operatively connected with a lever 46 which is mounted for horizontal pivotal movement on the frame 3. A spring 47 on the frame 3 bears against the lever 46 so as to hold the fingers 44 of the clutch normally extended into the spaces between the spokes 48 of the sprocket wheel 41. A clutch actuating rod 49 is pivoted, as at 50, to the receptacle and at the other end the rod is connected with the lever 46 so as to move the same against the tension of the spring 47 on movement of the forming receptacle to its bundle discharging position. From the construction just described it will be seen that when the receptacle is moved to its vertical position the sliding clutch 43 will be actuated so as to throw the carrier belt out of gear.

The frame 3 is provided with a bundle receiving rack 51 which is located at the bottom of the carrier 5. This rack consists preferably of suitably spaced bundle supporting members 52. The central portion of each rod 37 of the carrier is provided with a lip 53 to engage the curved portion 53' of the central frame forming element 54 of the carrier. This curved portion is located at the lower end to engage and to cause the fingers 55 of the rod to assume their operative positions immediately at the beginning of their upward movement on the carrier belts. The bottom of the receptacle is formed preferably of a series of parallel spaced rearwardly extending tines 56. When the receptacle is in shock discharging position the keepers 18 will be released from the latch members 19 and the gates of the receptacle will be free to open under resistance of the bundles. Stops 57 are carried by the receptacle 1 and they are designed to engage the frame 3 to limit the movement thereof in one direction when the receptacle is in the dotted line position shown in Fig. 6 of the drawings.

I claim:

1. In a shock former, a shock-receiving receptacle having its longitudinal axis normally in a forwardly and downwardly inclined position, and movable from such position to a substantially vertical or shock-discharging position, the receptacle having an opening therein at one side, a swinging closure for the opening, means for holding the closure in an open position on bundle-receiving position of the receptacle and for holding the closure in a closed position on shock-discharging position of the receptacle, a bundle carrier operating to discharge the bundles into the receptacle, said carrier including a driving shaft having a loose driving element thereon, a movable clutch element mounted on the shaft, the said clutch element and driving element respectively interlocking each other in one position of the clutch element, and an actuating rod operatively connecting the receptacle with the clutch element and operating to move the element to a released position automatically on movement of the receptacle to a shock-discharging position.

2. A shock former comprising a receptacle having its longitudinal axis normally in a forwardly and downwardly inclined position, and movable from such position to a substantially vertical or shock-discharging position, means for holding the receptacle in either one of such positions, means for releasing the holding means so as to permit movement of the receptacle from one of said positions to the other, said receptacle having normally closed gates therein at its lower side, movable latch mechanism supported by the receptacle adjacent to the gates and engaging the gates to hold them normally against swinging movement when the receptacle is in bundle-receiving position, a portable frame supporting the receptacle, and means on the frame for engaging the said movable latch mechanism and moving such mechanism to a released position on movement of the receptacle to shock-discharging position.

3. In a shock former, a shock receptacle having its longitudinal axis normally in a forwardly and downwardly inclined position, and movable from such position to a substantially vertical or shock-discharging position, means for holding the receptacle in either one of such positions, means for releasing the holding means so as to permit movement of the receptacle from one of such positions to the other, a normally closed swinging gate at the lower side of the receptacle, a keeper supported by the gate, a spring pressed latch member supported by the receptacle adjacent to the gate and engaging the keeper to hold the gate against swinging movement when the receptacle is in its bundle-receiving position, a supporting frame for the receptacle, and a latch releasing member carried by the supporting frame and having an actuating surface disposed directly in the path of the latch member to move the latch member to a released position on movement of the receptacle to a shock-discharging position.

4. A shock former comprising a portable frame, a receptacle having its longitudinal axis normally in a forwardly and downwardly inclined position with respect to the frame, said receptacle being pivoted near its forward end to the frame and being movable from its normal position to a substantially vertical or shock-discharging position, the said receptacle having a normally closed shock-discharging gate therein at its lower side, the said receptacle having an opening therein at its upper side, a bundle carrier having its discharge end located immediately adjacent the opening when the receptacle is in bundle-receiving position, the said carrier including a driving shaft having a loose driving element thereon, a movable clutch element on the shaft coöperating with the driving element to fix the same to the shaft when the receptacle is in a bundle-receiving position, a movable clutch element actuating member supported by the frame and normally holding the clutch element positively engaged with the driving element, and a rod connected at one end with the member and at its opposite end with the receptacle and operating simultaneously or movement of the receptacle to a shock-discharging position to move the clutch element out of engagement with the driving element.

In testimony whereof I affix my signature in presence of two witnesses.

EDWARD OLSON.

Witnesses:
T. E. GILBERTSON,
E. J. ASLERAN.